United States Patent [19]

Fujibayashi

[11] Patent Number: 4,506,970
[45] Date of Patent: Mar. 26, 1985

[54] FOCUS DETECTION DEVICE

[75] Inventor: Kazuo Fujibayashi, Kanagawa, Japan

[73] Assignee: Canon Kabushiki Kaisha, Tokyo, Japan

[21] Appl. No.: 505,073

[22] Filed: Jun. 16, 1983

[30] Foreign Application Priority Data

Jul. 9, 1982 [JP] Japan .................................. 57-120309
Jul. 9, 1982 [JP] Japan .................................. 57-120310

[51] Int. Cl.³ .............................................. G03B 3/00
[52] U.S. Cl. ..................................... 354/406; 352/140
[58] Field of Search ................ 352/140; 354/406, 407

[56] References Cited
U.S. PATENT DOCUMENTS 4,283,863 8/1981 Heiniger et al. .................... 354/406

4,333,716 6/1982 Sakane et al. ....................... 352/140

Primary Examiner—Russell E. Adams
Attorney, Agent, or Firm—Toren, McGeady and Stanger

[57] ABSTRACT

A focus detection device is disclosed which has a light path splitting apparatus provided just in front of a diaphragm in the optical path of an image forming optical system and a different optical system from the aforesaid image forming optical system in the direction in which the split-off part of the light bundle by the aforesaid splitting apparatus goes. On an optical axis of the focus detecting optical system, the conjugate positions to a prescribed focal plane of the image forming optical system and at least two positions on its optical axis are occupied by respective photo-sensitive elements using their outputs for in-focus detection.

6 Claims, 13 Drawing Figures

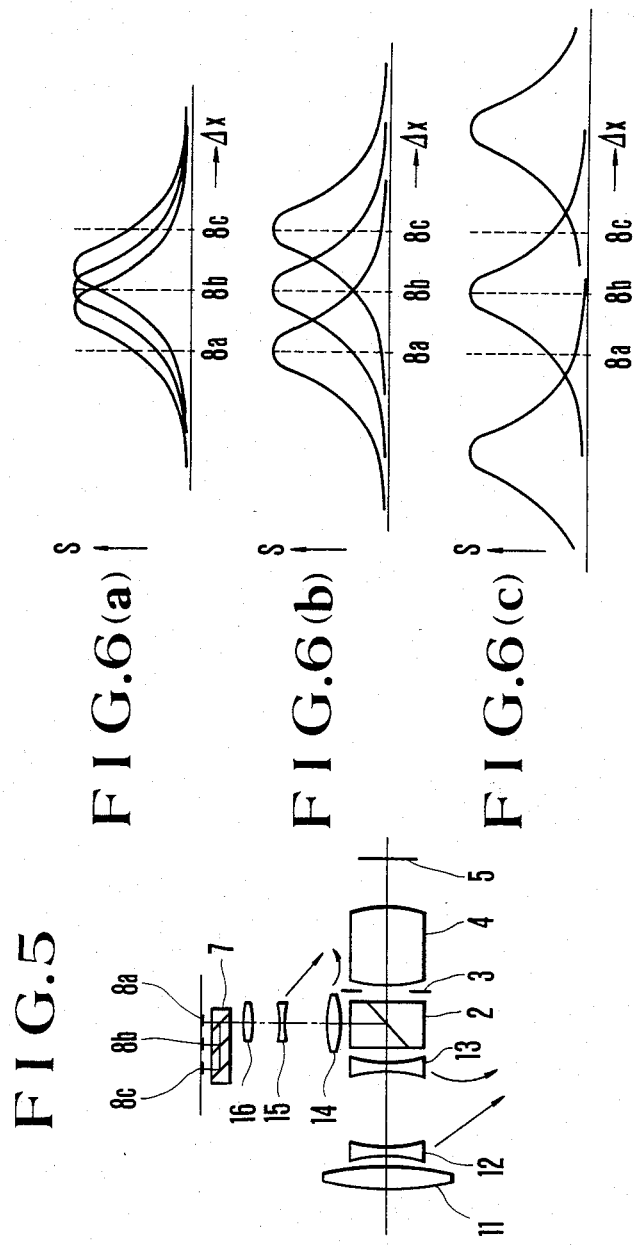

FOCUS DETECTION DEVICE

BACKGROUND OF THE INVENTION

1. Field of the Invention

This invention relates to focus detection devices for image forming optical systems, and more particularly to a device for detecting a sharp focus condition by comparing the outputs of at least two photo-sensitive elements on a common optical axis at respective axes of the conjugate point to the prescribed focal plane of the image forming optical system and its nearby points.

2. Description of the Prior Art

In prior art focus detection devices, the light splitter for routing part of the image bearing light bundle to the photo-sensitive elements is in the optical path of the image forming optical system, but behind the diaphragm. Such an arrangement, therefore, makes the accuracy of focus detection dependent upon the diaphragm aperture size of the image forming optical system. Particularly when the diaphragm stops down, focus detection accuracy is objectionably deteriorated.

Also, when applied to image forming optical systems of the zoom type, the light splitter system arrangement for the photo-sensitive elements in the optical path of the image forming optical system resulted in focus detection dependence on the focal length of the image forming optical system. In this situation, although accurate detection is attained in the telephoto positions, in the wide angle positions where the focus depth is deepened, poor detection results. In actual practice, after focus detection was performed in the wide angle positions, when zooming was subsequently carried out, the image was blurred as the object to be photographed was put outside the focus depth when in the telephoto positions.

A device for focus detection by providing a light path splitting means in part of the image forming optical system was disclosed in Japanese Laid-Open Patent Application Nos. Sho 57-54763, 57-192910 and 57-128312 and Japanese Laid-Open Utility Model Application Nos. Sho 55-57723 and 56-128622.

An object of the present invention is to provide a focus detection device which can always perform constant, accurate focus detection even when the diaphragm aperture size of the image forming optical system varies.

Another object of the present invention is to provide a focus detection device which can always perform accurate focus detection even when the focal length of the image forming optical system varies.

SUMMARY OF THE INVENTION

To accomplish the objects of the invention, the construction feature and arrangement of the constituent parts of the focus detection device is that just in front of a diaphragm in the optical path of an image forming optical system there is provided a light path splitting means. In the direction of the split light bundle by the light path splitting means, there is provided a different optical system for focus detection from the image forming optical system, and photo-sensitive elements are at positions on a common optical axis of the focus detecting optical system. The photo-sensitive elements are conjugate to a prescribed focal plane of the image forming optical system and conjugate to at least two positions on the optical axis of the image forming optical system, whereby the outputs of all the aforesaid photo-sensitive elements are used for in-focus detection.

When the image forming optical system has a focal length changing function with control means, the optical system for focus detection is also provided with focal length changing means connected operatively to the control means. Particularly by making the focal length changing functions of these two systems operate in reversed relation to each other, the objects of the invention are more nearly achieved.

BRIEF DESCRIPTION OF THE DRAWINGS

FIGS. 1 and 5 are schematic diagrams of optical arrangements illustrating an embodiment of the present invention.

FIGS. 3 and 6a thru c are graphs illustrating different focusing variations of the outputs of the individual photo-sensitive elements in the focus detection device of the invention.

DETAILED DESCRIPTION OF THE PREFERRED EMBODIMENTS

Figure 1:
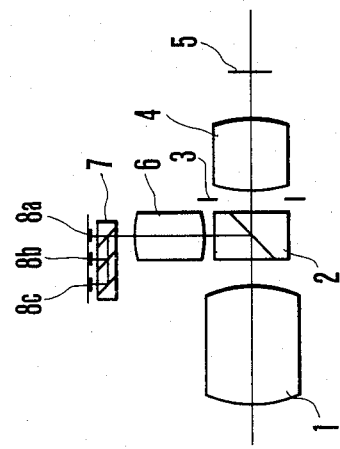

FIG. 1 schematically illustrates an optical arrangement of one embodiment of the focus detection device according to the present invention. In FIG. 1 there is shown a front group of an image forming optical system 1; a light splitting means 2 having a half mirror; a diaphragm 3 of the image forming optical system; a rear group 4 of the image forming optical system; a prescribed focal plane or film surface 5; an optical system 6 for focus detection; a light splitting prism 7 for focus detection which splits a light beam into three parts; and three photo-sensitive elements 8a, 8b and 8c arranged to receive the split parts of the light beam respectively.

Though this embodiment has been described in connection with three photo-sensitive elements 8a, 8b and 8c, the present invention is not confined to three in number. Thus, 2 or 4 more elements may be used if necessary.

Figure 2:
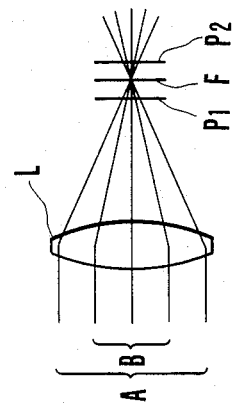
FIG. 2 is a diagram of the geometry which explains the principles of the focus detecting method of the invention.

FIG. 2 is a diagram of the geometry which explains the principles of focus detection of the device of the invention. The respective reference symbols and the elements corresponding thereto are: L, a focusing lens; F, a prescribed focal plane; P1, a front point of defocus in position; and P2, a rear point of defocus in position. Referring to FIG. 1, if the photo-sensitive element 8b occupies an equivalent point in position to an axial point on the prescribed focal plane F, then the other photo-sensitive elements 8a and 8c take equivalent points to axial ones on the planes P1 and P2 respectively. The photo-sensitive elements 8a, 8b and 8c of FIG. 1 measure the degree of sharpness of the image formed by the front and gear groups 1 and 4. By comparing their outputs with each other, detection is made of when the image forming optical system is at its sharpest focus. The simultaneous occurrence of a condition in which the outputs of the photo-sensitive elements 8a and 8c coincide with each other and a condition in which the output of the photo-sensitive element 8b is higher than the outputs of the other two represents establishment of the sharpest focus, while other situations are taken as out-of-focus conditions. The diameter of a light bundle with the diaphragm at full open is identified by the reference symbol A, and the diameter of the light bundle when the diaphragm is stopped down is identified by the reference symbol B.

Figure 3:
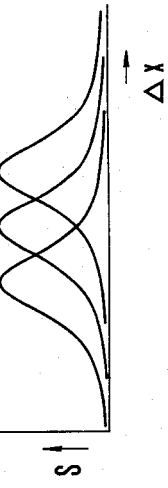
Figure 8:
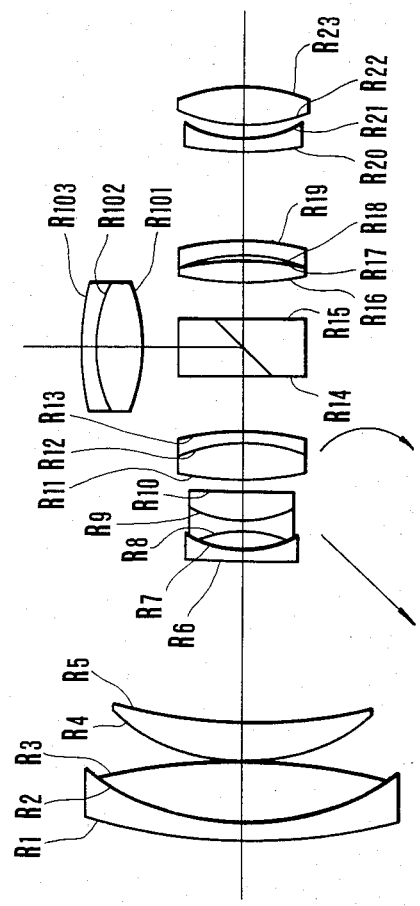
FIGS. 8 and 9 are lens block diagrams of two different specific optical systems of the invention.

FIG. 3 illustrates how the output of the photo-sensitive element 8a, 8b, 8c varies with defocusing in the form of a graph where the abscissa is in the amount of movement, $\Delta x$, of the focusing member of the image forming optical system, and the ordinate is in the value of output, S, of each of the photo-sensitive elements 8a, 8b and 8c. Each curve shows that when the plane of sharpest focus arrives at the image-receiving surface of the photo-sensitive element 8a, 8b, 8c, its output reaches a peak value. As the deviation increases, the output drops. Now assuming that the focus detecting optical system is an ideal image forming optical system, and the lengths of the optical paths between the photo-sensitive elements 8a and 8b and the photo-sensitive elements 8b and 8c are equal to each other, when the photo-sensitive element 8b coincides with the prescribed focal plane F, the outputs of the photo-sensitive elements 8a and 8c coincide with each other. Also, when the photo-sensitive element 8b does not coincide with the prescribed focal plane F, the output of the photo-sensitive element 8a does not coincide with the output of the photo-sensitive element 8c. Therefore, by comparing the outputs of the photo-sensitive elements 8a and 8c, it is possible to tell whether the image is in sharp focus. It is, however, noted that even when largely defocused, the outputs of the photo-sensitive elements 8a and 8c become almost equal to each other, detecting the in-focus condition. Since the output of the photo-sensitive element 8b for the in-focus condition takes a peak value, discrimination of whether or not the outputs of the photo-sensitive elements 8a and 8c coincide with each other represents the in-focus condition and is possible by measuring the output of the photo-sensitive element 8b.

Figure 4:
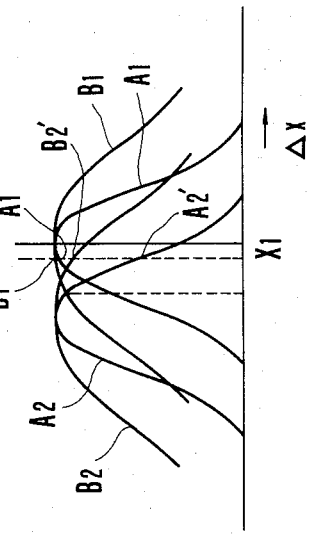
FIG. 4 is a graph illustrating variations in the aperture size of the outputs of the photo-sensitive elements.

FIG. 4 illustrates variations of the outputs of the photo-sensitive elements 8a, 8b, 8c with variation of the light bundle diameter of the focus detecting optical system between values A and B, where the abscissa and ordinate are similar to those in FIG. 3. The outputs of the photo-sensitive elements 8a and 8c for the light bundle A are at A1 and A2 respectively, and those for the light bundle B are at B1 and B2 respectively. The accuracy of focus detection depends upon the output differences of the absolute values from the photo-sensitive elements 8a, 8b and 8c at a certain station point of the focusing member of the image-forming optical system. With the use of the bright light bundle from the image forming optical system of FIG. 2, the outputs of the photo-sensitive elements 8a and 8c for a certain focusing station, x1, have values A1' and A2' respectively. Also, with the use of the light bundle B, they become B1' and B2'. When focus detection is carried out by using the difference between the output values of the photo-sensitive elements 8a and 8c, it is certain that (A1'−A2') is larger than (B1'−B2'). For this reason, it is better to use the light bundle A in focus detection, since greater focus detection accuracy is obtained.

In other words, as illustrated by the curves A1 and A2 in FIG. 4, the output is sensitive to defocusing. On the other hand, when the diaphragm 3 is closed down, as illustrated by the curves B1 and B2 in FIG. 4, the rate of change is lowered. It is understood that when the focus detecting optical system 6 is the same as the image forming optical system, the range finding accuracy changes depending upon the size of the diaphragm 3 aperture of the image forming optical system. According to the present invention, therefore, use is made of the light splitter 7 just in front of the diaphragm 3 so that the light bundle that does not pass through the diaphragm 3 aperture opening, is used to carry out focus detection. An advantage is that the focus detection accuracy is always equivalent to that of the fully open diaphragm 3 of the image forming optical system.

Also in the present invention, respective reference symbols fR identify the focal length of the rear group of the image forming optical system, fM the focal length of the focus detecting optical system, $\Delta R$ the shift of the image plane across the film surface as the object distance changes from infinity to a minimum, and $\Delta M$ the corresponding shift of the image plane across the image receiving surface of the photo-sensitive element. The following relationship is given:

$$\Delta M \approx (fM/fR)^2 \cdot \Delta R$$

By changing the focal length fM, since the optical system is constructed in the form of an interchangeable lens or zoom lens system, it is possible to differentiate from each other the lengths of the optical paths between the photo-sensitive elements 8a, 8b and 8c.

Thereby there is produced the advantage that an optimum image shift can be obtained. This occurs because if the image shift for the photo-sensitive element 8a, 8b, 8c is too small, the output change is too small to insure the desired detection and accuracy if the image shift is too great, blurring appears in a wide range, making it difficult to distinguish far and near focus.

It is to be noted here that, the F-number is expressed by the formula F=f/D (where D is the diameter of the lens and f is the focal length) and as the image forming optical system for focus detection has a constant diameter, the increase of the focal length f darkens the F-number with deepening of the focus depth. But, while the focus depth is proportional to the F-number, and, therefore, to the f, the image shift is proportional to the square of the f. The foregoing advantage saves cancellation by the increase in the F-number which is large.

Also with no regard to the diaphragm 3 of the image forming optical system, the diaphragm 3 can be inserted into and taken out of the focus detecting optical system 6. Thereby it is also possible to cope with a situation in which the image is largely blurred in such a way that the diaphragm 3 is first inserted to render focus detection possible though it is rough, and then when the diaphragm 3 is full open, accurate focus detection is subsequently carried out.

It is preferred that the focal length of the focus detecting optical system 6 is longer than that of the image forming optical system.

FIG. 5 is a schematic view of an optical arrangement of another embodiment of the focus detection device according to the present invention.

In the drawing, reference numeral 11 identifies a focusing lens; 12 a variator having the magnification varying function; 13 a compensator having the image shift compensating function; 14 and 15 a varifocal optical system with the compensator 14 having the image shift compensating function and the variator 15 having the magnification varying function; 16 an image forming lens; and other similar parts to those in FIG. 1 are denoted by the same reference numerals.

The compensator 14 through the light path splitting prism 7 constitutes the optical system for focal detection 6.

Figure 7A:
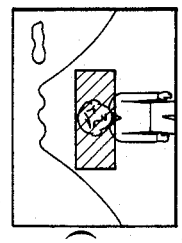
FIGS. 7(a) to 7(c) are pictorial representations with changes of the range finding area.
Figure 7B:
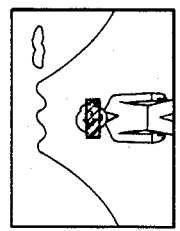
Figure 7C:
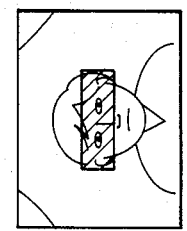
Figure 9:
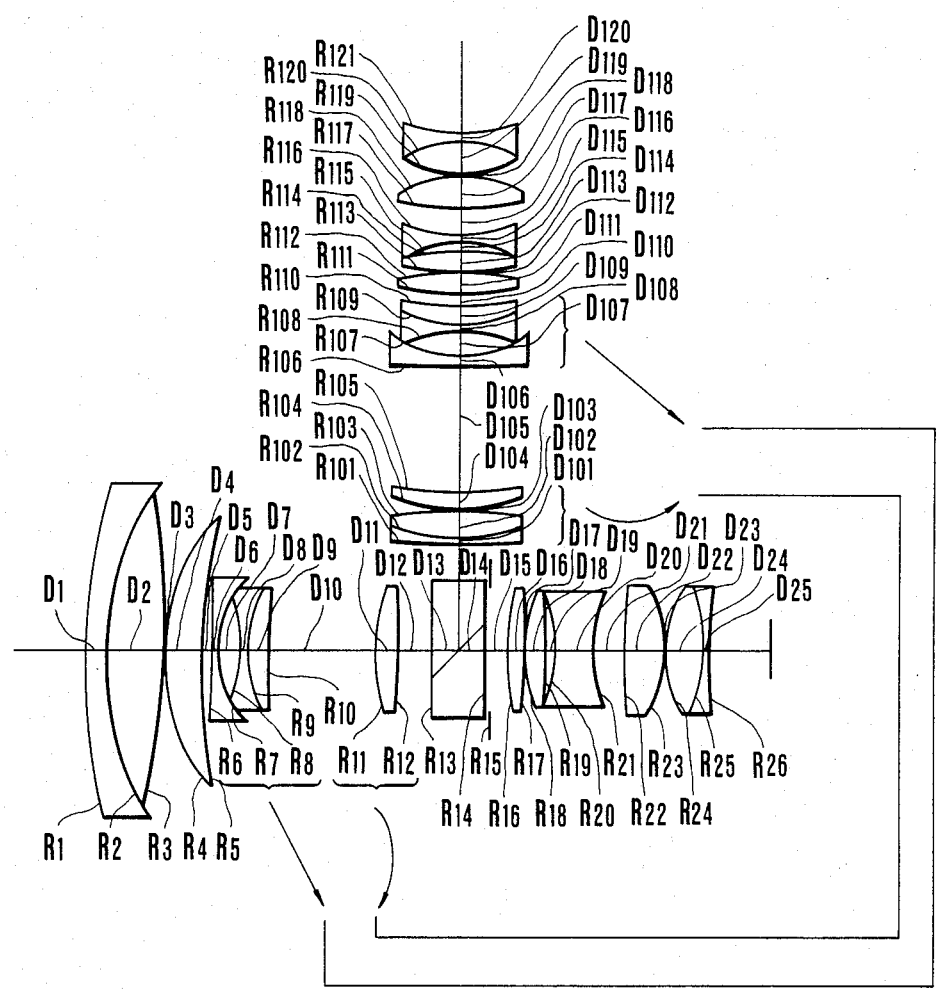

In FIG. 5, when the photography system is zoomed, the shift of the sharp focus plane across the film surface changes in proportion to the square of the zoom ratio. If the focal length of the focus detecting optical system 6 is constant, the image shift for the photo-sensitive elements 8a, 8b and 8c also changes in proportion to the square of the zoom ratio. FIGS. 6(a) to 6(c) illustrate variations of the outputs S of the individual photo-sensitive elements 8a, 8b and 8c in comparison with one another by taking the amount of movement, $\Delta x$ of the focusing lens 1. From these graphs of FIGS. 6(a) to 6(c), it is understood that the required amount of movement, $\Delta x$, of the focusing lens 1 increases with an increase in the focal length of the image forming optical system, where FIGS. 6(a) to 6(c) represent respectively the wide angle, intermediate and telephoto positions. Even though the focusing lens 1 is moved the same distance, the output S changes as the zooming position changes. This is because the focus depth changes depending upon the focal length. For this reason, after focusing has been completed in the wide angle positions, when zooming is performed on the telephoto positions, as such zooming narrows the focus depth, it often happens that the in-focus condition is broken. Therefore, it is desirable that in spite of zooming of the image forming optical system, the focus detection accuracy in the photo-sensitive elements 8a, 8b and 8c is constant always allowing focus detection within the focus depth in the telephoto positions. In order to accomplish this, the variator 15 and compensator 14 of the focus detecting optical system 6 may moved in response to zooming of the variator 12 and the compensator 13, as shown in FIG. 5. Thereby the magnification changing action of the image forming optical system is diminished. That is, by the compensator 14 and the variator 15, the magnification is reversed so that the focal length of the system comprised of the focusing lens 11, the variator 12, the compensator 13, the light splitter 2, the compensator 14, the variator 15, and the image forming lens 16 of FIG. 5 is maintained constant during zooming of the image forming optical system. As a result, even when the establishment of the in-focus condition in the wide angle position is followed by zooming to the telephoto position, there is no possibility of exceeding the focus depth. On the other hand, according to the present invention, there is produced an additional advantage arising from inclusion of the zooming function into the focus detecting optical system 6 so that the range finding area can be changed in response to the change of the focal length of the image forming optical system. Therefore, when the focus detecting optical system 6 has a constant focal length f, the range finding region relative to the picture frame does not change even by zooming the image forming optical system. With the image forming optical system in the wide angle position, the picture frame often contains a vast mixture of objects often from close to distant. If the range finding area is large, a conflict between the distant and close object images takes place, causing decreased focal accuracy. Also, when the image forming optical system 6 has a long focal length, because of its narrow angle of field coverage, the range finding area becomes small, making it difficult to set the range in the intended target area due to a shaking hand or the like. In conclusion, it can be said that when using the wide angle, a small range finding area is better, and, on the other hand, when using the telephoto, a large range finding area is better. Therefore, if the image forming optical system is provided with an unchanged range finding area during zooming, inconvenient situations will be encountered with either wide angle or telephoto positions. FIGS. 7(a) to 7(c) illustrate a change of the range finding area relative to the picture frame with a change in the focal length, where the range finding area is indicated by hatching. FIG. 7(a) represents wide angle shooting with the range finding area covering a wide target area to allow for a high possibility of the far-near conflict. FIGS. 7(b) and 7(c) represent respectively a well adjusted range finding area in accordance with wide angle and telephoto shootings. In this embodiment, it is possible to construct the focus detecting optical system 6 in such a way that the overall focal length of the front group of the image forming optical system 1 and the focus detecting optical system 6 is constantly independent from zooming of the image forming optical system. Thereby the range finding area is automatically changed, being small for wide angle positions and large for telephoto positions. That is, the range finding area, when in the wide angle positions, becomes like that shown in FIG. 7(b), and when in the telephoto position, like that shown in FIG. 7(c). If the focus detecting optical system 6 is not provided with the zooming function, the setting in the wide angle position will be as shown in FIG. 7(a) with the far-and-near conflict. It is noted that the focus detecting optical system 6 not always necessitates a continuous variation of the focal length f thereof, and may be provided with discrete focal lengths f, which are selectively operated depending upon the focal length f of the image forming optical system.

In the focus detecting device of the invention, when the image forming optical system is largely defocused, as the outputs of the photo-sensitive elements 8a, 8b and 8c are all lowered, becoming almost equal to each other, it becomes difficult in some situations to find the direction in which the focusing lens 11 is to move. In such a situation, if the focal length f of the focus detecting optical system 6 is properly chosen, the outputs of the photo-sensitive elements 8a, 8b, 8c can always be compared with one another as illustrated in FIG. 6(b), so that the direction of movement of the focusing lens 11 can always be detected. Therefore, it is also possible to perform focus detection in such a manner that, in the 1st stage, the focus detecting optical system 6 is set with the shortest focal length being in the direction in which an adjustment must be made to bring the image into focus. Then the focus detecting optical system 6 is zoomed for accurate detection of an in-focus condition.

Though the foregoing embodiment has been described in conjunction with the photographic optical system which is a zoom lens, the same principles may be applied to cameras with interchangeable objectives including wide angle and telephoto, while permitting the advantages of the invention to be preserved.

As in the above, according to the present invention, focus detection can always be performed with constant high accuracy independent from the diaphragm aperture opening size of the image forming optical system. Furthermore, by arbitrarily changing the focal length f of the optical system for focus detection 6 from the image forming optical system, optimum range finding ability can be obtained. Also, despite the change in the focal length f of the image forming optical system, superior focal detection can always be carried out by the focus detection device of the present invention. Also, the target area in the finder field of view can be maintained independent from the focal length change of the image forming optical system by the optical system of the invention, thereby giving not only the advantage of automatically detecting the in-focus condition with high reliability, but also the advantage of facilitating visual focusing while looking through the finder.

Numerical examples of optical systems of the invention follow. In the numerical examples, Ri identify the radius of curvature of the i-th lens surface counting from the front; Di the i-th lens thickness or air separation counting from the front; Ni and νi the refractive index and Abbe number of the glass of the i-th lens element counting from the front, where the Ri, Di, Ni and νi for the focus detecting optical system are given subscripts which are numbered consecutively from the light path splitting means 2 beginning respectively with R101, D101, N101 and ν101.

Numerical Example 1

1. Image forming optical system:
f = 1–4.753  FNo. = 1.8–2.0
Image Angle 2ω = 42°–9.2°

| R | D | Nd | νd |
|---|---|---|---|
| R1 = 6.471 | D1 = 0.150 | N1 = 1.80518 | ν1 = 25.4 |
| R2 = 2.689 | D2 = 0.593 | N2 = 1.58913 | ν2 = 61.0 |
| R3 = −8.183 | D3 = 0.011 | | |
| R4 = 2.098 | D4 = 0.360 | N3 = 1.58913 | ν3 = 61.0 |
| R5 = 7.249 | D5 = Variable | | |
| R6 = 25.887 | D6 = 0.068 | N4 = 1.69700 | ν4 = 48.5 |
| R7 = 0.863 | D7 = 0.216 | | |
| R8 = −1.191 | D8 = 0.068 | N5 = 1.69350 | ν5 = 53.2 |
| R9 = 1.012 | D9 = 0.300 | N6 = 1.80518 | ν6 = 25.4 |
| R10 = −13.014 | D10 = Variable | | |
| R11 = 2.949 | D11 = 0.390 | N7 = 1.62374 | ν7 = 47.1 |
| R12 = −1.374 | D12 = 0.068 | N8 = 1.80518 | ν8 = 25.4 |
| R13 = −3.288 | D13 = Variable | | |
| R14 = ∞ | D14 = 0.563 | N9 = 1.51633 | ν9 = 64.1 |
| R15 = ∞ | D15 = 0.397 | | |
| R16 = 4.211 | D16 = 0.203 | N10 = 1.72342 | ν10 = 38.0 |
| R17 = −3.553 | D17 = 0.061 | | |
| R18 = −1.671 | D18 = 0.103 | N11 = 1.80518 | ν11 = 25.4 |
| R19 = −2.615 | D19 = 0.850 | | |
| R20 = 4.574 | D20 = 0.103 | N12 = 1.84666 | ν12 = 23.9 |
| R21 = 1.190 | D21 = 0.123 | | |
| R22 = 1.526 | D22 = 0.357 | N13 = 1.77250 | ν13 = 49.6 |
| R23 = −2.272 | | | |
| b.f. = 1.625 | | | |

Diaphragm at a distance of 0.21 ahead the 16th surface

| f | 1.000 | 2.18 | 4.753 |
|---|---|---|---|
| D5 | 0.125 | 1.081 | 1.519 |
| D10 | 1.489 | 1.051 | 0.096 |
| D13 | 0.550 | 0.033 | 0.550 |

The overall focal length of the surfaces 16 through 23 = 2.167

2. Focus detecting optical system: f = 3.003  FNo. = 1:2.5

| R | | D | Nd | νd |
|---|---|---|---|---|
| 101 | 1.991 | 0.463 | 1.53172 | 48.9 |
| 102 | −1.226 | 0.135 | 1.80518 | 25.4 |
| 103 | −2.718 | | | |
| b.f. = 2.746 | | | | |

3. Overall focal length of the front group of the image forming optical system and the focus detecting optical system

| Image Forming Optical System | f | 1. | 4.753 |
|---|---|---|---|
| Focus Detecting System | f | 3.003 | 3.003 |
| Overall Focal Length | f | 1.386 | 6.337 |

Numerical Example 2

1. Photographic Optical System:
f = 8.711–24.779  FNo. = 1:1
Surfaces 13 and 14 define a half prism.
Surface 15 is a stop

| R | D | Nd | νd |
|---|---|---|---|
| R1 = 112.03 | D1 = 2.00 | N1 = 1.80518 | ν1 = 25.4 |
| R2 = 37.25 | D2 = 7.52 | N2 = 1.58913 | ν2 = 61.0 |
| R3 = −76.41 | D3 = 0.12 | | |
| R4 = 25.08 | D4 = 4.51 | N3 = 1.62299 | ν3 = 58.2 |
| R5 = 67.90 | D5 = Variable | | |
| R6 = −953.36 | D6 = 0.90 | N4 = 1.58913 | ν4 = 61.0 |
| R7 = 11.47 | D7 = 3.24 | | |
| R8 = −19.41 | D8 = 0.72 | N5 = 1.58913 | ν5 = 61.0 |
| R9 = 14.17 | D9 = 2.69 | N6 = 1.80518 | ν6 = 25.4 |
| R10 = 72.77 | D10 = Variable | | |
| R11 = 27.54 | D11 = 2.68 | N7 = 1.58913 | ν7 = 61.0 |
| R12 = −107.51 | D12 = Variable | | |
| R13 = 0.0 | D13 = 7.00 | N8 = 1.51633 | ν8 = 64.1 |
| R14 = 0.0 | D14 = 0.50 | | |
| R15 = 0.0 | D15 = 2.50 | | |
| R16 = 33.89 | D16 = 2.24 | N9 = 1.77250 | ν9 = 49.6 |
| R17 = −8678.08 | D17 = 0.10 | | |
| R18 = 21.22 | D18 = 2.65 | N10 = 1.77250 | ν10 = 49.6 |
| R19 = −317.31 | D19 = 1.13 | | |
| R20 = −17.76 | D20 = 5.03 | N11 = 1.80518 | ν11 = 25.4 |
| R21 = 17.05 | D21 = 3.86 | | |
| R22 = 84.74 | D22 = 5.22 | N12 = 1.77250 | ν12 = 49.6 |
| R23 = −15.36 | D23 = 0.07 | | |
| R24 = 14.31 | D24 = 4.68 | N13 = 1.77250 | ν13 = 49.6 |
| R25 = −21.14 | D25 = 0.60 | N14 = 1.80518 | ν14 = 25.4 |
| R26 = 67.66 | | | |

| f | 8.711 | 14.682 | 24.779 |
|---|---|---|---|
| D5 | 1.296 | 9.511 | 14.394 |
| D10 | 14.343 | 9.478 | 1.245 |
| D12 | 4.35 | 1 | 4.35 |

(Wide Angle Side)  (Telephoto Side)
b.f. = 7.95
Focal Length of Surfaces 16 to 26 = 13.94

2. Focus Detecting Optical System:
f = 14.03–39.982  FNo. = 1:2–2.5

| R | D | Nd | νd |
|---|---|---|---|
| R101 = 103.69 | D101 = 1.00 | N101 = 1.80518 | ν101 = 25.4 |
| R102 = 36.80 | D102 = 3.00 | N102 = 1.58913 | ν102 = 61.0 |
| R103 = −90.86 | D103 = 0.12 | 1. | |
| R104 = 27.11 | D104 = 2.50 | N103 = 1.58913 | ν103 = 61.0 |
| R105 = 123.98 | D105 = Variable | 1. | |
| R106 = −921.15 | D106 = 0.90 | N104 = 1.62299 | ν104 = 58.2 |
| R107 = 11.49 | D107 = 3.38 | 1. | |
| R108 = −18.12 | D108 = 0.90 | N105 = 1.51633 | ν105 = 64.1 |
| R109 = 15.29 | D109 = 2.63 | N106 = 1.80518 | ν106 = 25.4 |
| R110 = 76.14 | D110 = Variable | 1. | |
| R111 = 34.96 | D111 = 2.56 | N107 = 1.58913 | ν107 = 61.0 |
| R112 = −69.15 | D112 = 0.20 | 1. | |
| R113 = 55.75 | D113 = 2.60 | N108 = 1.80610 | ν108 = 40.9 |
| R114 = −53.54 | D114 = 1.26 | 1. | |
| R115 = −13.83 | D115 = 1.00 | N109 = 1.62004 | ν109 = 36.3 |
| R116 = 19.95 | D116 = 3.46 | 1. | |
| R117 = 37.63 | D117 = 4.00 | N110 = 1.77250 | ν110 = 49.6 |
| R118 = −16.21 | D118 = 0.10 | 1. | |
| R119 = 16.61 | D119 = 4.00 | N111 = 1.61484 | ν111 = 51.2 |
| R120 = −13.17 | D120 = 1.00 | N112 = 1.71736 | ν112 = 29.5 |
| R121 = 23.70 | | | |

| f | 14.027 | 30.326 | 39.982 |
|---|---|---|---|
| D105 | 1.757 | 13.191 | 15.567 |
| D110 | 15.056 | 6.385 | 1.248 |

(Wide Angle Side)  (Telephoto Side)
b.f. = 21.80

3. Overall Focal Length of the Front Group of Photographic system + Focus Detecting Optical System:

| Photographic System | f | 8.711 | 24.779 |
|---|---|---|---|
| Focus Detecting System | f | 39.982 | 14.027 |

-continued

| Numerical Example 2 | | | |
|---|---|---|---|
| Overall Focal Length | f | 24.984 | 24.934 |

What I claim:

1. A device for detecting the focusing state of an objective lens, comprising:

splitting means for splitting a light beam from the objective lens into parts;

image forming means for forming an image based on one of the split parts of the light beam by said splitting means, said image forming means being made able to differentiate the magnification of the image to be formed; and detecting means responsive to detection of the image formed by said image forming means for producing an output signal representing the focusing state of the objective lens.

2. A device of claim 1, wherein said image forming means has an optical system capable of zooming.

3. A device of claim 2, wherein said image forming means changes the image magnification as the focal length of the objective lens changes.

4. A device of claim 3, wherein said image forming means functions to form the image always at a constant magnification regardless of the variation of the focal length of the objective lens.

5. A device of claim 4, wherein said light splitting means lies on the object side of a diaphragm of the objective lens.

6. A device of claim 4, wherein said detecting means has a plurality of sensors arranged in front of, and in rear of, a conjugate plane to a prescribed focal plane for the objective lens.

* * * * *